April 22, 1958 J. D. BARR 2,832,028

POSITIONAL CONTROL SYSTEM

Filed Oct. 27, 1953 2 Sheets-Sheet 1

INVENTOR
JOHN D. BARR
BY Herbert H. Thompson
his ATTORNEY.

April 22, 1958 J. D. BARR 2,832,028

POSITIONAL CONTROL SYSTEM

Filed Oct. 27, 1953 2 Sheets-Sheet 2

INVENTOR
JOHN D. BARR
BY
Herbert H. Thompson
his ATTORNEY

United States Patent Office 2,832,028

Patented Apr. 22, 1958

2,832,028

POSITIONAL CONTROL SYSTEMS

John Denzil Barr, Warlingham, England, assignor to The Sperry Gyroscope Company Limited, Brentford, England, a company of Great Britain Application October 27, 1953, Serial No. 388,588

Claims priority, application Great Britain October 9, 1953

8 Claims. (Cl. 318—448)

The invention relates to amplifier arrangements and one object is to enable a signal to be provided which is a predetermined time function of the amplifier arrangement output.

For example, the amplifier arrangement may be a part of a servo system for controlling a variable to assume a value corresponding to a set value in which a servo motor is controlled by the output of the amplifier and controls the variable.

In such systems the servo motor is controlled in dependence on an error signal which is a measure of the difference between the value of the variable and the set input value, the error signal being applied as the input to the electronic amplifier that controls the servo motor. This error signal may be provided by an instrument which measures the difference between the set input value and the value of the variable directly, or it may be provided by means of two instruments one of which measures the value of the variable, and the other of which measures the set input value, in conjunction with a device for producing an output that measures the difference between the inputs. In either case the input to the amplifier may be in the form of a continuous electric quantity of which the magnitude and polarity are measures of the magnitude and sense of the error signal or an alternating electric quantity of which the magnitude and phase sense are measures of the magnitude and sense of the error signal.

In many cases it is more convenient to use an input to the amplifier in the form of a modulated A. C. carrier both because the design of amplifiers that are responsive to A. C. inputs is in many ways simpler than that of amplifiers responsive to D. C. as well as A. C. inputs, and also because pick-offs for producing the error signals (or the measure of the variable and the measure of the set input value) may be more satisfactory when designed to produce an A. C. output i. e. an A. C. signal of carrier frequency whose amplitude depends on the magnitude of the error and whose phase sense relative to a reference A. C. signal of the same frequency depends on the sense of the error than when designed to produce a D. C. output, i. e. a voltage or current output whose magnitude and sense at any moment are proportional to the magnitude and sense of the error. It is to be noted that when reference is made herein to a D. C. signal, this expression is intended to include a signal that reverses in sense on reversal of the sense of the error or other quantity measured by the signal. The present invention is concerned with servo systems in which the input to the amplifier is in the form of a modulated A. C. signal.

It is well known that it is desirable in many cases to cause the servo motor to operate at a speed, or to provide a torque, which depends not only on the magnitude of the error signal, but also on a time function or time functions of that magnitude. Such functions operate broadly to improve the stability and accuracy of the control system. In particular it may be desirable to cause the servo motor to operate at a speed, or to provide a torque, dependent on the magnitude of the error signal, on the first time derivative of that magnitude and possibly also on the first time integral of that magnitude.

It is also well known that it is possible to cause the speed, or the torque, of the servo motor to depend on time functions of the error signal by providing in a feed-back loop within the system elements that derive from any signal applied to them further signals that are such functions of the signals applied to them that the motor is controlled in the required manner. Such functions may be referred to as the "inverse" of the time functions in dependence on which it is required that the servo motor be controlled. The meaning of the term "inverse function" is implicit in the following statement:

If the desired function be that function which expresses or defines a certain quantity Y in terms of a quantity X and its behaviour with respect to time T, then the inverse of that function is that function which expresses the quantity X in terms of the quantity Y and its behaviour with respect to time T.

When the set input value is in the form of a D. C. signal, and is passed throughout the system to the servo motor in the form of a D. C. signal, it is a simple matter to provide the required elements in the feed-back path, since combinations of resistors and capacitors and/or inductors will provide functions that resemble the required time functions sufficiently closely. Passive networks of resistors and capacitors and/or inductors will not provide true time integrals or derivatives, but provide functions that are designated as "pseudo-integrals" and "pseudo-derivatives." It is to be understood that reference in this specification to time integrals and time derivatives are to be taken as reference to pseudo-integrals and pseudo-derivatives whenever the context so requires. However, when the set input value is in the form of a modulated A. C. signal, difficulties arise in providing the required elements because simple combinations of resistors and capacitors and/or inductors will not provide the required functions from modulated A. C. signals.

One solution that has been proposed is to use as the element in the feed-back path a resonant circuit tuned to the carrier frequency. This tuned circuit is arranged to offer a high-impedance to signals at the carrier frequency so that in the steady state there is substantially no feed-back. When the carrier is modulated side-band signals are produced at frequencies that depend on the rate of change of the modulating signal, and these side-bands are attenuated to different degrees by the resonant circuit, with the result that the feed-back is made to depend on the rate of change of the error signal. Such an arrangement is only usable when the carrier frequency is very stable, since any change in the frequency of the carrier will affect the transfer function of the tuned circuit.

Another solution that has been proposed is the use of an element that has a transfer function dependent on the duration of any signal applied to it, e. g. a thermistor. In this case the circuit can be arranged so that when the amplitude of the carrier is zero, the thermistor element is cold and acts to reduce feed-back from the output of the amplifier to the input practically to zero. This condition is maintained when the carrier first assumes a finite value, but as the element heats up, the amount of feed-back passed from the output to the input of the amplifier is gradually increased. The functions that can be obtained by the use of known elements of the thermistor type can only be predicted approximately, and they do not correspond very closely with the functions usually required.

A further solution has been proposed for use when the output of the amplifier is in the form of a D. C. signal, i. e. when the amplifier operates also as a phase-sense-sensitive detector. In such cases it has been proposed to obtain the required inverse function by means of resistors and capacitors and/or inductors from the output of the amplifier, or from some stage at which it is in the form of a D. C. signal, and to feed the function so obtained in series with the A. C. input to the amplifier. In such cases the amplifier is required to operate not only as a phase-sense-sensitive rectifier, but also as a D. C. amplifier. Many forms of amplifier suitable as phase-sense-sensitive detectors will not operate as D. C. amplifiers, and in such cases this system cannot be used.

Many of the disadvantages of the systems set out in the preceding paragraphs may be overcome by feeding the output of the amplifier (if that output is in the form of a D. C. signal, or a D. C. signal derived from the output of the amplifier, if that output is in the form of an A. C. signal) to a network of resistive and reactive elements designed to produce the required inverse function and to feed the function so obtained to a modulator arranged to produce an A. C. signal whose carrier frequency is the same as that of the input signal and whose magnitude and phase sense correspond to the magnitude and polarity of the output of the network, and by feeding the modulated A. C. signal so obtained to the input terminals of the amplifier.

It has been found that there are various disadvantages in using capacitors as the reactive elements in such networks and in using conventional modulators employing electronic discharge devices or metal rectifiers.

According to the present invention, there is provided an amplifier arrangement in which an A. C. feed-back signal that is, or includes, a predetermined time function of the amplifier output is derived by resistive and inductive elements from the output of the amplifier if that output is in the form of a D. C. signal, or from a D. C. signal derived from the output of the amplifier if that output is in the form of an A. C. signal, in which the D. C. signal is applied to a magnetic modulator to produce the A. C. feedback signal in the form of a modulated signal with a carrier frequency the same as that of the input signal to the amplifier and with a magnitude and phase sense corresponding to the magnitude and polarity of the D. C. signal, and in which the modulated A. C. feedback signal so produced is applied together with the input signal as the input to the amplifier.

In a particular embodiment of the invention the magnetic modulator comprises a saturable core or cores arranged to form two closed magnetic paths, an output winding (e. g. serially connected windings), encircling at least a part of each path and connected to a pair of output terminals which are connected to the input of the amplifier, means for exerting an alternating magnetising force such that small alternating fluxes are produced in the two paths directed so that they produce alternating voltages of opposite sense at the modulator output terminals, means for producing steady fluxes in the two paths so directed that at any instant when the steady flux in one path is in the same direction as the alternating flux, the steady flux in the other path is in the opposite direction to the alternating flux, and means for producing control fluxes in the two paths so directed that at any instant when the control flux in one path is in the same direction as the alternating flux, the control flux in the other path is also in the same direction as the alternating flux, the magnitude and direction of the control fluxes relative to the steady fluxes being dependent on a linear time function of the amplifier output, wherein the core material and the steady fluxes are such that when the total values, averaged over a cycle of the alternating flux, of the fluxes in the two paths are equal, equal changes in the instantaneous values of the fluxes in the two paths are produced by changes in the instantaneous values of the magnetising force, but when the total values, averaged over a cycle of the alternating flux, of the fluxes in the two paths are unequal, the difference between the change in flux produced in one path and the change of flux produced in the other path is at least approximately proportional to the difference between the total values of the fluxes, whereby the magnitude and phase sense of the alternating voltage produced at the output terminals is made to depend on the magnitude and sense of the time function of the amplifier output. Preferably a control winding (e. g. serially connected windings), encircling at least a part of each path are connected in series with the output of the amplifier and the servo motor, and a slug winding, or windings 2, 2′, are arranged to cause the fluxes produced in the two paths by the control winding, or windings to be linear time functions of the current fed to the servo motor. The slug winding, or windings, may be connected across a low impedance source of alternating current so as to comprise the means for exerting the alternating magnetising force. Furthermore, a high impedance source of D. C. potential may be connected to the modulator output terminals to provide the means for producing the steady fluxes.

A servo system for causing a variable to assume a value corresponding to a set input value may include a servo motor for controlling the variable and controlled by the output of an amplifier arrangement in accordance with the invention, the input signal to which is an A. C. signal representing by its amplitude and phase sense the magnitude and sense of the difference between the actual value of the variable and the set value. A common example of such a system is a follow-up system in which a rotatable support for a sensitive element such as a gyroscope is caused to follow the rotation of a sensitive element by means of an A. C. inductive pick-off, the output of which varies in magnitude with the magnitude of the error between the sensitive element and follow-up element and reverses in phase with the sense of the error.

Two embodiments of the invention will now be described by way of example with reference to the accompanying drawings in which.

Figure 1:
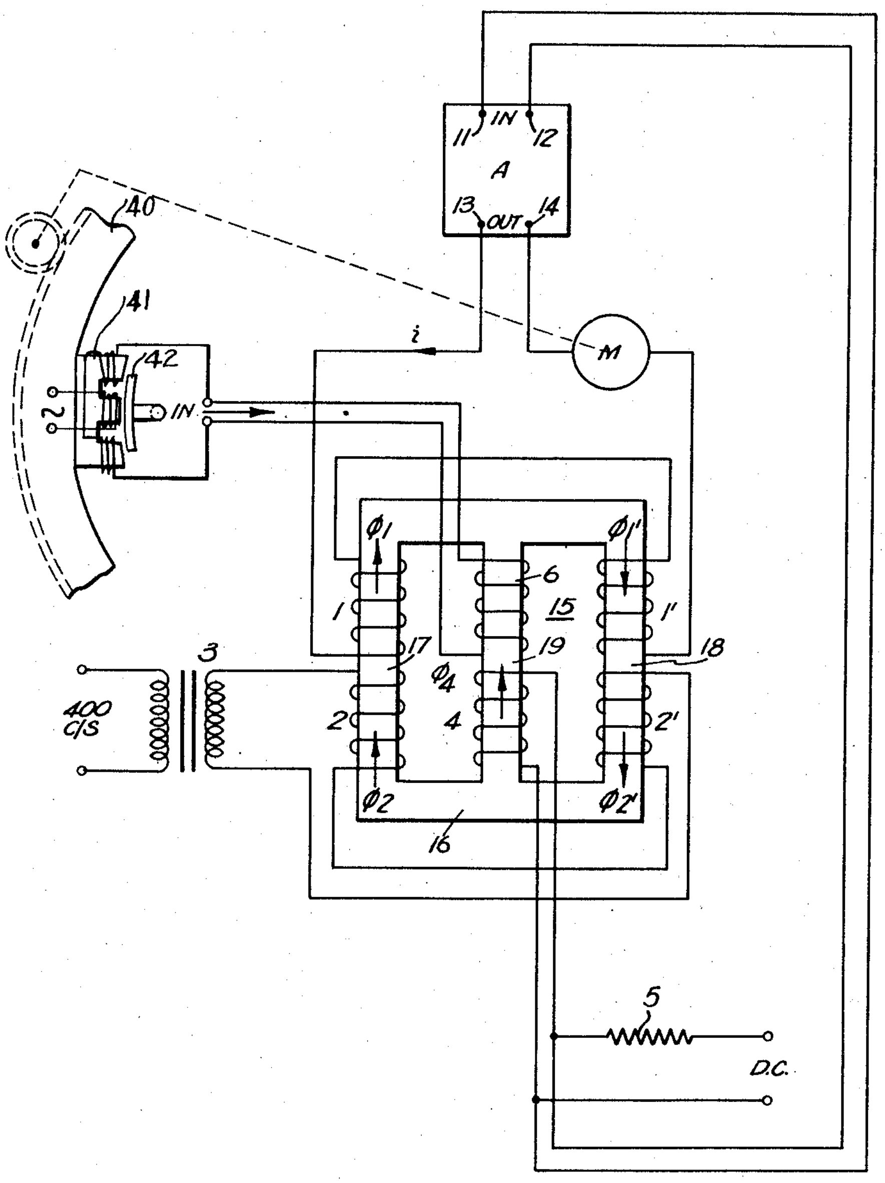
Fig. 1 shows a circuit diagram of a servo system in which a D. C. servo motor is caused to adjust the value of a variable and provides a torque dependent not only on the magnitude and sense of the error signal but also on the rate of change of the error signal.

In the servo system shown in Fig. 1, the servo or follow-up motor M is designed to cause support 40 to follow the position of the sensitive element (not shown), the error signal between the two elements being developed by some form of inductive pick-off such as an E pick-off 41 supplied with alternating current, the output winding or windings being connected to the input terminals of the system. In such a system the three-fingered portion of the pick-off is usually mounted on the follow-up element and the magnetic element 42 on the sensitive element, an example being shown in the patent to Wittkuhns, No. 1,921,983, Follow-Up Device for Gyro Compasses, dated August 8, 1933. The A. C. output signal is supplied as the input to an amplifier A designed not only to amplify this wave but also to convert it to a D. C. signal whose magnitude and polarity represent the magnitude and sense of the error signal. To give the amplifier the required transfer function current negative feed-back is provided between its output terminals 13 and 14 and its input terminals 11 and 12. To give the feed-back signal the required inverse function and also to apply it to the input of the amplifier in the form of a suppressed-carrier amplitude-modulated wave, a single device 15 is used in which resistive and reactive elements are combined with a magnetic modulator.

The device 15 comprises a three-limb core of magnetic material constructed from two stacks of E-shaped laminations. On each outer limb 17 and 18 is wound a control winding 1 and 1′ and a combined excitation and slug winding 2 and 2′. The control windings 1 and 1′ are connected in series in the circuit connecting the amplifier output terminals 13 and 14 to the servo motor M so that the load current $i$ flows through each of them, and are arranged on the outer limb in such a way that they produce opposing fluxes $\phi_1$ and $\phi_1'$ in the centre limb 19. The combined excitation and slug windings 2 and 2' are connected in series to the secondary of a transformer 3 the primary of which is connected to a source of 400 C./S. alternating current. The secondary of this transformer has a low impedance so that the winding acts as a slug for signal frequencies. The windings on the outer limbs 17 and 18 are arranged in such a way that at any instant the fluxes produced by them in the centre limb are opposed. The arrows $\phi_2$ and $\phi_2'$ indicate fluxes flowing in the same direction in each outer limb as the control fluxes $\phi_1$ and $\phi_1'$. It is to be understood that during the succeeding carrier half cycle the directions of fluxes $\phi_2$ and $\phi_2'$ will be reversed. As a result of the slug action of the combined excitation and slug windings 2 and 2', when a direct current is passed through the control windings 1 and 1', fluxes are produced in the outer limbs which depend on that current with a single exponential delay. Thus, these fluxes are related to the control current in the same way as the output of a simple so-called "integrating" circuit comprising a resistor and a capacitor is related to the input.

On the centre limb 19 there is wound a combined D. C. bias and A. C. output winding 4. It is connected to the input terminals 11 and 12 of the amplifier A and also to a high impedance D. C. source through a resistor 5 and the resulting current in this winding exerts a magnetising force on the core which biases the outer limbs to non-linear parts of their magnetisation curves. Whatever the direction of flow of the control current $i$ the fluxes $\phi_1$ and $\phi_1'$ in the outer limbs 17 and 18 caused by the control current oppose the bias flux $\phi_4$ in one limb and assist it in the other.

The core material and the bias flux $\phi_4$ are chosen so that the difference in incremental permeability of the outer limbs is approximately proportional to the difference in their total fluxes, which in turn is equal to twice the flux caused by the bias current.

The carrier supplied to the excitation and slug windings 2 and 2' produces equal and opposite A. C. fields in the outer limbs which are small compared with the field produced by the control windings. The difference in the A. C. fluxes in the outer limbs is proportional to the difference in their permeabilities and is equal to the flux in the centre limb. This A. C. flux in the centre limb induces an A. C. signal in the output winding 4 which depends on the control current $i$ with a single exponential delay.

In the particular system described the error signal is provided by a low impedance source and a step-up transformer is therefore needed before it can be applied to the input of the amplifier. The output winding 4 of the modulator is used as the secondary for this transformer, the primary being a winding 6 on the centre limb 19. In this case it is essential for the operation of the modulator that the impedance of the source of error signal should be several times larger than that of the primary winding 6.

In some servo systems it may be desirable that the motor shall be controlled in dependence not only on the error and the rate of change of the error, but also on the integral of the error. For this purpose the feed-back circuit must derive terms not only depending on the output and the integral of the output, but also on the rate of change of the output. For this purpose it is necessary to add a differentiating network to the combined network and magnetic modulator described above. To avoid the use of capacitors the differentiating network may comprise a transformer, which it may be shown, can function in a manner equivalent to a capacitor-resistor differentiating network. In the interests of economy of space and weight it is convenient to combine the transformer with the magnetic modulator as a single unit.

Figure 2:
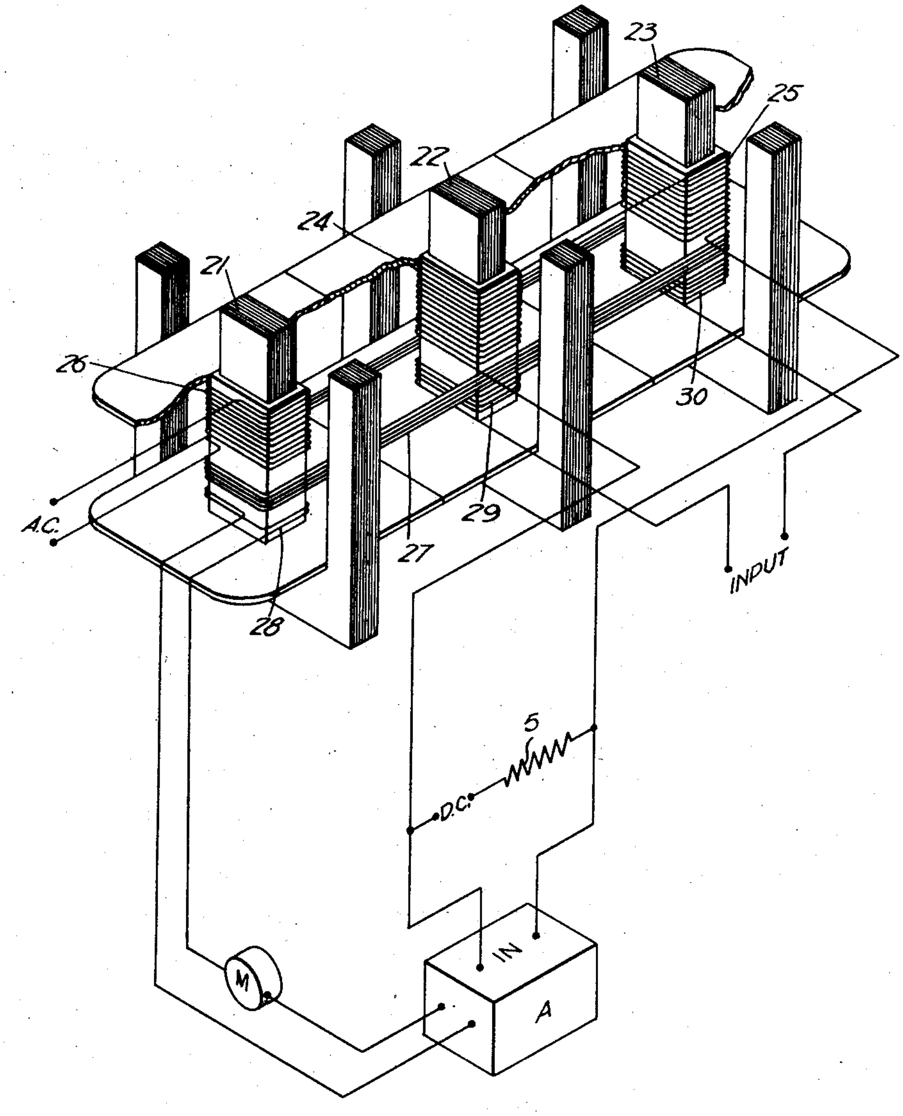
Fig. 2 shows a magnetic modulator in isometric projection together with details of the circuit in accordance with the invention.

The modified form of combined transformer and magnetic modulator shown in Fig. 2 comprises three cores 21, 22, 23 each consisting of two stacks of E-shaped laminations. Bobbins are provided on the centre limb of each core to carry the required windings. Two of the bobbins carry combined D. C. bias and A. C. output windings 24 and 25 and the third carries an excitation winding 26 connected to a low impedance source of 400 C./S. current. A short-circuited slug winding 27 is wound round all three bobbins in such a way that equal magnetising forces alternating at 400 C./S. are exerted on the two cores carrying the D. C. bias and output windings 24 and 25.

The output windings 24 and 25 are connected in series to the input terminals of the amplifier A and also to a high impedance D. C. source which biases these two cores 22 and 23 into a non-linear part of their magnetisation curves. The windings are wound in such directions that when the flux produced in core 22 by the bias current in winding 24 opposes the flux produced in core 22 by the current in the slug winding 27 the flux produced in core 23 by the bias current in winding 25 assists the flux produced in core 23 by the current in slug winding 27.

The core material and bias flux are chosen so that the difference in the incremental permeabilities of the two cores 22 and 23 is approximately proportional to the current in the slug winding and their sum is approximately constant, so that the difference between the flux in these cores is proportional to the difference between their permeabilities and an output voltage is produced which is the difference between the voltages induced in the two output windings. This difference is proportional to the difference between the fluxes in the two cores and is therefore proportional to the current in the slug windings.

As the excitation winding 26 on core 21 is connected to a low impedance source it can be considered as a slug winding for signal frequencies. This core also carries a control winding 28, the current in which determines the current in the slug winding 27, and therefore the carrier frequency output in winding 24 and 25. The transfer function relating the carrier output to the control current is of the form $kp/(Ap^2+p+C)$ where K, A and C are constants and $p$ is the Laplace variable.

If this device is connected in the feed-back circuit of a high gain amplifier having a D. C. output and A. C. input, the transfer function of the amplifier with feed-back is of the form $(Ap^2+p+C)/Kp$ which may be re-written as $(A/K)p+1/K+(C/K)(1/p)$. From this it may be seen that the output contains terms proportional to the rate of error and integral of error.

To enable the amplifier to be fed from a low impedance source, the device may also be used as an input transformer by providing additional windings 29 and 30 on cores 22 and 23.

In the operation of the servo system of Fig. 1, the error signal from the pick-off in the form of a suppressed-carrier amplitude wave having a carrier frequency of 400 C./S. is applied to the coil 6 and induces a voltage component in the coil 4 which is applied to the terminals 11 and 12 of the main amplifier, the coils 6 and 4 constituting the windings of a step-up transformer. The D. C. output of the amplifier is applied to the motor M and causes it to operate in a sense tending to reduce the error signal to zero.

It is convenient to consider the action of the device 15 in providing feed-back with an additional rate term independently of its action as a step-up transformer. For the purpose of feed-back and for deriving a rate term, the amplifier output is applied not only to the motor M but to the two control windings 1 and 1' of the device 15. In the manner already described, the direct current passing through the control windings produces, due to the slug action of the excitation windings 2 and 2', D. C. fluxes in the outer limbs which depend on that current with a single exponential delay. Due to the bias flux $\phi_4$, there is a difference in the permeabilities of the outer limbs, and a corresponding difference in the A. C. fluxes induced in the outer limbs by the excitation windings, which is a measure of the output of the amplifier with the single exponential delay.

Hence the A. C. signal induced in the output winding 4 includes in addition to the stepped-up signal from the pick-off a negative feed-back component and a component with single exponential delay. Accordingly, the torque of the motor is controlled in dependence both on the error signal derived from the pick-off and on the rate of change of that signal.

In the operation of the servo system incorporating the device of Fig. 2, the pick-off supplies a suppressed carrier amplitude wave having a carrier frequency of 400 C./S. to the coils 29 and 30. Coil 29 with coil 24 and coil 30 with coil 25 respectively constitute step-up transformers so that the coils 24 and 25 have induced in them a stepped-up component of voltage corresponding to the pick-off output and applied to the input terminals of the amplifier.

The amplifier produces in response to the stepped-up signal from the pick-off a D. C. output which is applied to the motor M in a sense tending to reduce the output of the pick-off to zero.

The amplifier output is also applied to the coil 28 with the result that the coils 24 and 25 have induced in them a negative feedback component, together with rate and integral terms. The rate term produces damping and the integral term tends to wipe out velocity lags.

Since many changes could be made in the above construction and many apparently widely difference embodiments of this invention could be made without departing from the scope thereof, it is intended that all matter contained in the above description or shown in the accompanying drawings shall be interpreted as illustrative and not in a limiting sense.

I claim:

1. A servo system for causing a variable to assume a value corresponding to a set input value in which the magnitude and sense of the difference between the set input value and the value of the variable constitutes an error signal that is represented by the amplitude and phase sense of an A. C. signal, said system comprising means including an A. C. amplifier and detector for producing a D. C. output signal in response to an A. C. input signal, a servomotor connected to the output of the amplifying and detecting means, means for coupling said error signal to the input of the amplifying and detecting means, and a magnetic modulator coupled to the output of the amplifying and detecting means for converting the D. C. output of the amplifying and detecting means to an A. C. signal, the output of said magnetic modulator being coupled to the input of the amplifying and detecting means to provide a feed-back loop, the magnetic modulator including a slug winding for introducing an integral time function in the feed-back loop.

2. In a servo system, means including an A. C. amplifier and phase-sense-sensitive rectifier, and feed-back means coupling the output of said rectifier to the input of said amplifier, and modulating means forming a feed-back loop for connecting the D. C. output of the rectifier to the input of the A. C. amplifier, the modulating means including resistive-inductive means for introducing a time function in the feed-back loop.

3. Apparatus as defined in claim 2 wherein said modulating means comprises a magnetic modulator having a core of magnetic material and said resistive-inductive means comprises a short-circuited winding on the core of the magnetic modulator.

4. A servomotor control circuit for operating a D. C. servomotor in response to an A. C. error signal, said circuit comprising an A. C. amplifier, a phase detector coupled to the output of the amplifier for producing a D. C. signal whose magnitude and polarity are determined respectively by the amplitude and phase of the output of the amplifier, the output of the phase detector being connected to the servomotor, and means for combining and coupling the output of the phase detector and the A. C. error signal to the amplifier input, said last-named means including saturable core means having at least two closed magnetic paths, an input winding encircling a part of each path, the A. C. error signal being connected to the input winding, an output winding encircling a part of each path connected to the input of the amplifier, a high impedance potential source connected across the output winding to provide a steady flux in the two paths, a pair of series control windings encircling a part of each path and connected to the output of the phase detector, the control windings being connected to produce fluxes reenforcing the steady flux in one path and opposing the steady flux in the other path, and a pair of series exciting windings encircling a part of each of the paths and connected across a D. C. excitation voltage source of the same frequency as the A. C. error signal, the exciting windings being connected to produce alternating fluxes that at any given instance reenforce the steady flux in one path and oppose the steady flux in the other path, the source being of very low impedance, whereby the exciting windings provide an effective short-circuited winding on the core.

5. A servomotor control circuit as defined in claim 4 wherein the saturable core means includes a single magnetic core having two outer limbs and a middle limb, the input and output windings being positioned on the middle limb, the two control windings being positioned on the outer two limbs, and the two excitation windings being positioned on the outer two limbs.

6. A servo system as claimed in claim 2, in which the aforesaid time function is a linear function of the first time integral of the amplifier output.

7. A servo system as claimed in claim 2, in which the aforesaid time function is the linear function of the first time integral and the first time differential of the amplifier output.

8. A magnetic modulator comprising a saturable core or cores arranged to form two closed magnetic paths, an output winding encircling at least a part of each path and connected to a pair of output terminals which are connected to the input of the amplifier, means for exerting an alternating magnetising force such that small alternating fluxes are produced in the two paths directed so that they produce alternating voltages of opposite sense at the modulator output terminals, means for producing steady fluxes in the two paths so directed that at any instant when the steady flux in one path is in the same direction as the alternating flux, the steady flux in the other path is in the opposite direction to the alternating flux, and means for producing control fluxes in the two paths so directed that at any instant when the control flux in one path is in the same direction as the alternating flux, the control flux in the other path is also in the same direction as the alternating flux, the magnitude and direction of the control fluxes relative to the steady fluxes being dependent on a linear time function of the amplifier output, wherein the core material and the steady fluxes are such that when the total values, averaged over a cycle of the alternating flux, of the fluxes in the two paths are equal, equal changes in the instantaneous values of the fluxes in the two paths are produced by changes in the instantaneous values of the magnetising force, but when the total values, averaged over a cycle of the alternating flux, of the fluxes in the two paths are unequal, the difference between the change in flux produced in one path and the change of flux produced in the other is at least approximately proportional to the difference between the total values of the fluxes.

References Cited in the file of this patent

UNITED STATES PATENTS

| | | |
|---|---|---|
| 2,115,086 | Riggs | Apr. 26, 1938 |
| 2,401,168 | Kronenberger | May 28, 1946 |
| 2,436,807 | Isbister | Mar. 2, 1948 |
| 2,652,524 | Hornfeck | Sept. 15, 1953 |
| 2,678,419 | Bennett | May 11, 1954 |